United States Patent
Silva

[15] 3,643,144
[45] Feb. 15, 1972

[54] REGULATOR SYSTEM FOR A DC MOTOR DRIVE

[72] Inventor: Antonio Vicerte Silva, Williamsville, N.Y.

[73] Assignee: Westinghouse Electric Corporation, Pittsburgh, Pa.

[22] Filed: Feb. 19, 1970

[21] Appl. No.: 12,711

[52] U.S. Cl. ............................................. 318/258, 318/276
[51] Int. Cl. ........................................................... H02p 9/14
[58] Field of Search ...................................... 318/258, 276

[56] References Cited

UNITED STATES PATENTS 2,962,646  11/1960  Pell ........................................ 318/258
2,401,325  9/1968  Stringer ................................. 318/302
3,458,790  7/1969  Wilkerson ............................. 318/258

Primary Examiner—Benjamin Dobeck
Attorney—F. H. Henson, R. G. Brodahl and J. J. Wood

[57] ABSTRACT

A regulation system for a DC drive motor having unidirectional current transfer circuitry in the armature, and bilateral current transfer circuitry in the field winding. The system permits regeneration by field inversion, while at the same time protecting the motor under all conditions when the field is inverted.

5 Claims, 2 Drawing Figures

REGULATOR SYSTEM FOR A DC MOTOR DRIVE

BACKGROUND OF THE INVENTION

1. Field of the Invention

This invention relates to a regulator system which permits both regenerative and reversible operation of DC motor drives from a unidirectional armature voltage supply.

2. Description of the Prior Art

DC motors are used extensively in industry as driving power sources, particularly in mill operations. Invariably, during the course of normal mill operations, some regenerative capacity is required on the part of the motor and this means that the machine must temporarily abandon its role as a motor, and assume the function of a generator, returning power to the line. In order to accomplish this, the usual expedient is to provide dual converters in the motor armature circuit, so that when the motor acts as a generator, an alternate electrical path is available for the reversal of the armature current. This is a complete duplication of hardware, and since converters are relatively expensive, industry has perennially sought to provide the requisite regenerative capacity while at the same time reducing costs wherever possible.

The prior art has provided me solution by the utilization of direct current contactors in the armature or the field circuit to switch the motor terminals to achieve electrical operations in both functions. As may readily be appreciated, the solution thus afforded is somewhat cumbersome, with the concomitant disadvantage that the contactors require a finite time for actuation. This technique does not completely solve the problem because transient regeneration, necessary for deceleration is still impossible and the motor must be stopped completely before the contactors can be switched. Obviously then, this method is rarely employed.

SUMMARY OF THE INVENTION

The invention relates to a regulator system for a DC motor, having unidirectional current transfer means in the armature, the system enabling both regeneration and reversible operation. Means are provided for monitoring the motor speed to determine the generating period when the motor acts as a generator. Additional means are coupled to the monitoring means for reversing the direction of current flow through the field winding during the generating period, and also for restoring the initial direction of current flow. Finally, means are coupled to the unidirectional current transmission means, responsive to changes in the field flux $\phi$ in the region between $+\phi$ weak field and $-\phi$ weak field, for maintaining the armature current zero when the field flux is traversing the said region from either direction.

DESCRIPTION OF AN EXEMPLARY EMBODIMENT

Figure 1:
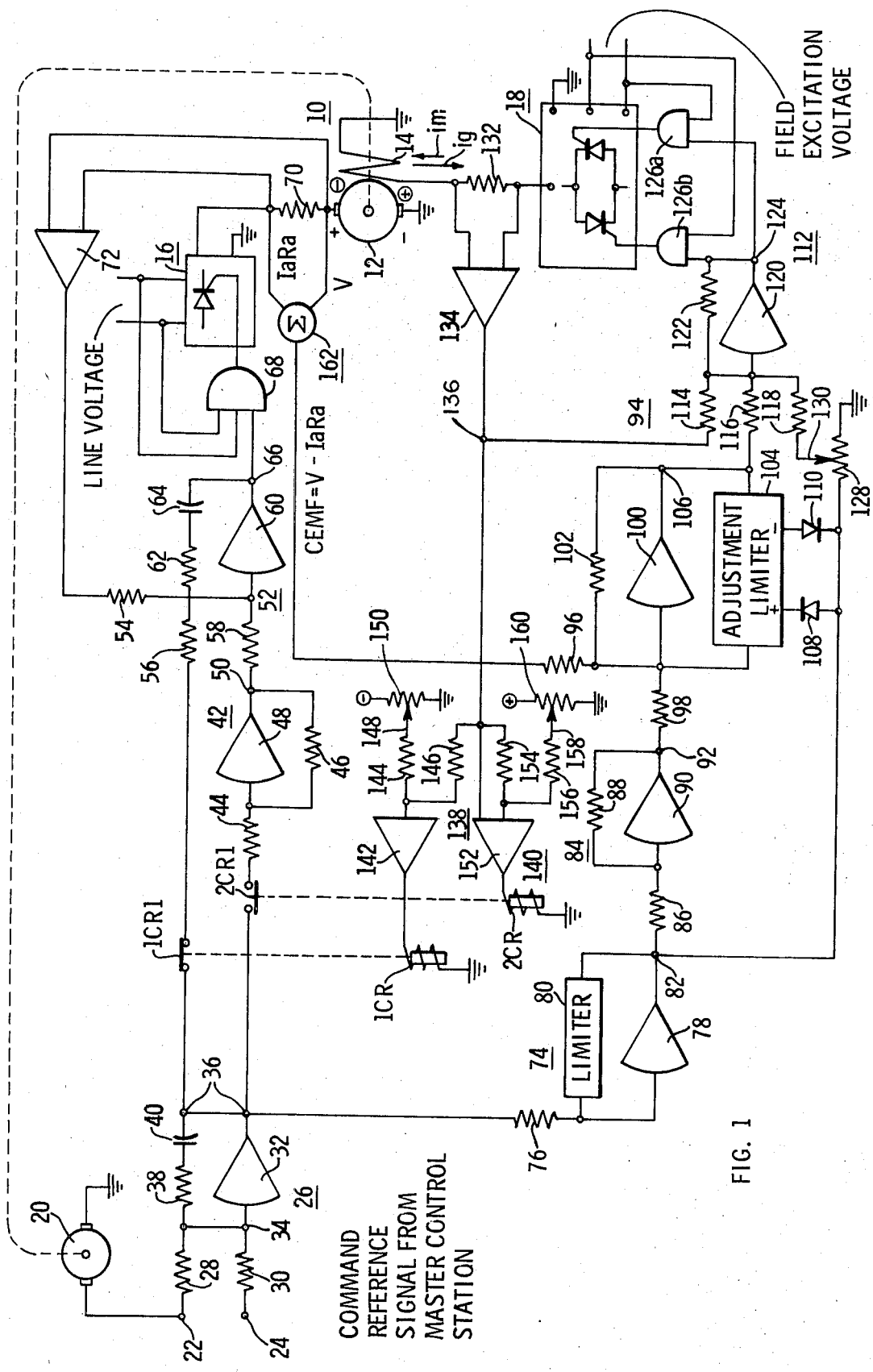
FIG. 1 is a schematic diagram showing the speed regulatory system in accordance with the invention.

A DC drive motor, such as may be encountered at the mill stands in steel-rolling mills, is identified generally at 10, and comprises an armature 12 and a field winding 14. The armature 12 is energized from a suitable line voltage source rectified under control of a unidirectional thyristor power module identified generally at 16, while the field 14 is energized from a bidirectional thyristor module indicated generally at 18.

For clarity in exposition, the control circuitry in the armature 12 and field 14 will be separately considered.

Referring now first to the armature control circuit, a tachometer generator 20 coupled to the armature shaft, is arranged to provide a voltage signal, which is a function of the motor speed, to terminal 22. A command reference voltage signal applied at terminal 24, is the speed command signal which is supplied from a master control console (not shown). The dual inputs at terminals 22 and 24 are applied as inputs to an operational amplifier, indicated generally at 26, adapted to serve as a speed controller. The operational amplifier 26 is functionally a proportional integrator and comprises input resistors 28 and 30 connected to terminals 22 and 24 respectfully. A high-gain DC amplifier 32 is connected to the input resistors 28 and 30 at node 34, the output of which is developed between node 36 and ground. A feedback path between nodes 34 and 36 includes the serial combination of resistor 38 and capacitor 40.

Two electrical paths have their common origin at node 36. The one path includes the normally closed contact 1CR1 of relay 1CR. The other path includes a normally open contact 2CR1 which is electrically actuated by and associated with the relay 2CR.

An operational amplifier, identified generally at 42, functions as an inverter, and includes an input resistor 44 and a feedback resistor 46. The high-gain DC amplifier is identified at 48, the output being developed between node 50 and ground.

An operational amplifier, identified generally at 52, serve as a current controller, and functions as a proportional integrator having input resistors 54, 56 and 58, a high-gain DC amplifier 60, and a feedback path including the serial combination of resistor 62 and capacitor 64. The input resistor 56 is connected in series with the contacts 1CR1. The output of the operational amplifier 52 is developed between node 66 and ground, and is applied to a gate pulse generating means 68. The gate 68 triggers the single converter thyristor circuitry 16. A resistor 70 connected in series with the armature 12, serves as a current sensor, and the voltage picked off this resistor 70 is applied to and amplified by a current-sensing amplifier 72, the output of which is applied to the input resistor 54 as indicated.

Consideration will now be given to the field control circuit. The node 36 at the output of speed controller 26, is connected to an operational amplifier indicated generally at 74 functioning as a bistable device, and comprising an input resistor 76, a high-gain DC amplifier 78, and a suitable limiter indicated symbolically at 80, selected so as to limit the output swing at node 82 between $+10$ and $-10$ v.

The bistable means 74 is connected to an operational amplifier, indicated generally at 84, having an input resistor 86 connected to node 82 and a resistor 88 in the feedback path of the high-gain DC amplifier 90. The output of the inverter 84 is developed between 92 and ground.

An operational amplifier, indicated generally at 94, serves as a counter electromotive force (CEMF) controller. The operational amplifier 94 comprises input resistors 96, 98, a high-gain DC amplifier 100 having a resistor 102 and an adjustment limiter indicated generally at 104 in the feedback path between node 106 and the input. The adjustment limiter 104 includes diodes 108 and 110, the anode of diode 108 and the cathode of diode 110 being connected in common to the node 82.

An operational amplifier 112 functions as the field current controller and comprises input resistors 114, 116 and 118, a high-gain DC amplifier 120 and a feedback resistor 122 connected between node 124 and the common connection to the input resistors 114, 116 and 118. The output of the operational amplifier is connected to gate pulse generating means 126a and 126b for triggering the respective sides of the bilateral converter field exciter 18. A weak field adjustment potentiometer 128 is connected between node 82 and ground, the wiper 130 of which is connected to one end of input resistor 118 as indicated.

A resistor 132 is serially connected in the field winding 14. The voltage developed across resistor 132 is applied to an amplifier 134 serving as a field current sensor. The output of amplifier 134, developed at node 136 is applied to input resistor 114 of the field current controller 112, and simultaneously to bistable amplifier indicated generally at 138 and 140. The bistable amplifier 138 comprises an amplifier proper 142, and input resistors 144 and 146. Input resistor 144 is connected to the amplifier 142 at one end, the other end being connected to the wiper 148 of a potentiometer 150, which is connected between a source of negative potential and ground. The resistor 146 is connected between the input to amplifiers 142 and node 136. The relay 1CR is connected in the output of the amplifier 142 as shown.

The bistable amplifier 140 is similarly constructed, comprising amplifier 152, input resistors 154, 156, the input resistor 156 being connected at one end to the input of amplifier 152, the other end being connected to a wiper 158 of a potentiometer 160 which is connected between a source of positive potential and ground.

Completing the description, a counter EMF sensor, which may be a magnetic amplifier, here identified symbolically by the summing point 162, is connected to resistor 70 so as to apply a signal proportional to $I_aR_a$, as one input, the other input being connected so as to detect the voltage across the armature 12. The algebraic summation of these two inputs is the counter EMF (CEMF) which is applied to the field current controller 112 through resistor 96.

OPERATION OF THE EXEMPLARY EMBODIMENT

Figure 2:
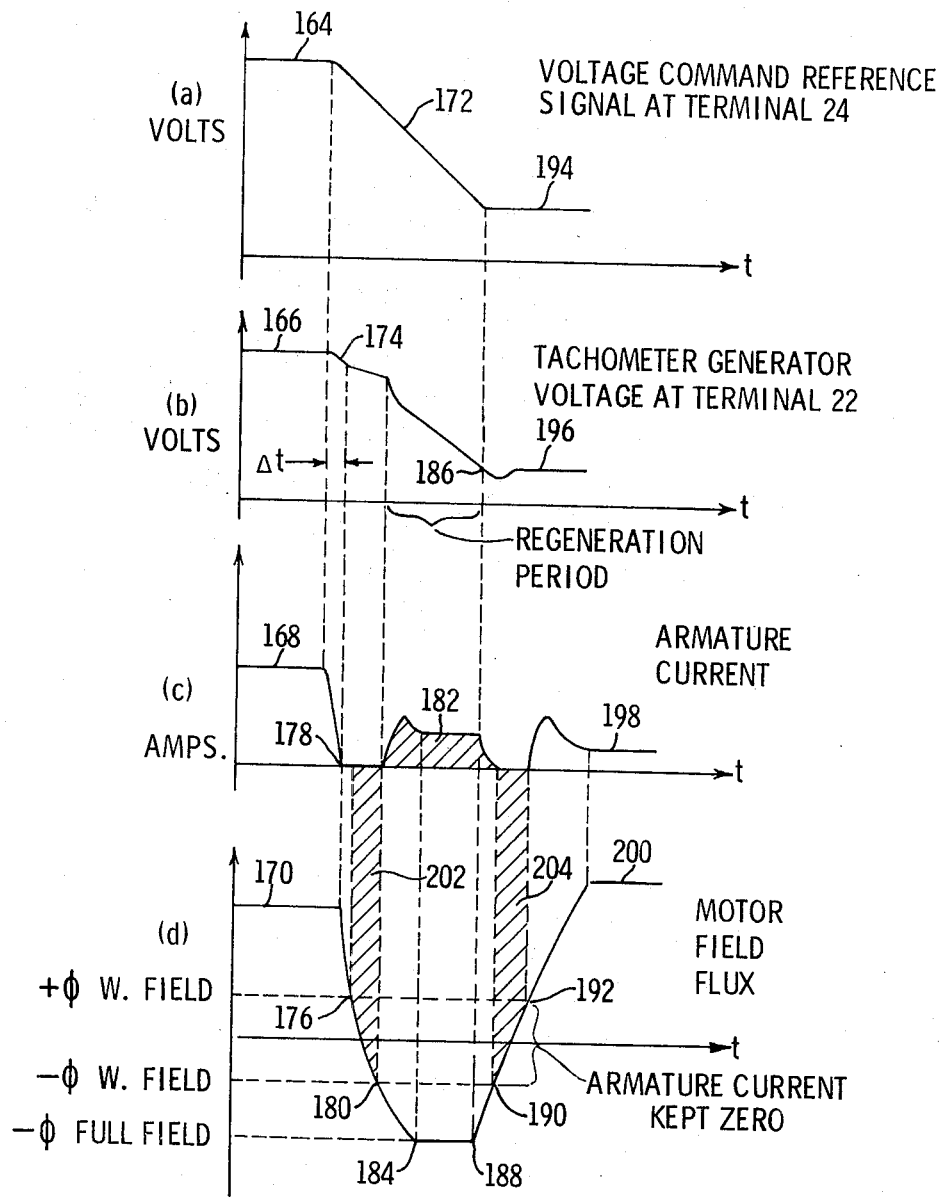
FIG. 2 is a series of curves, identified at (a) through (d) and used in explaining the operation of the regulatory system of FIG. 1.

Before describing the operation of the system, it will be helpful to briefly review some of the principles involved. The problems solved by this invention arise primarily during deceleration, when the speed of the motor is falling off. Under these conditions, if nothing were done, the speed of the motor would decrease as a result of frictional or load losses, since the unidirectional converter in the armature circuit, without more, would not permit regeneration. The present invention, allows regeneration by field inversion, while at the same time protecting the motor under all conditions, when the field is inverted from the weak field value in one polarity, say $+\phi wf$, to a weak field value in the other polarity, say $+\phi wf$. As may be observed in FIG. 2, (d) operation must be prevented in this field region in which the motor was never designed to operate. It is therefore important that in this field region i.e., from $+\phi wf$ to $-\phi wf$ and conversely, that the armature current be reduced to zero. It is during deceleration that the motor reverses its role and acts as a generator supplying current to the line.

In contemplation of this invention, the system must: (1) detect when the motor is acting as a generator, (2) when this decision has been made, the proper action must then be taken to reverse the field current, and (3) while the field is being reversed, and the flux magnitude is anywhere between $+\phi wf$ and $-\phi wf$ the armature current must be kept at zero. When the motor starts from a standing start, a command signal is applied from the mill master control console to terminal 24; arbitrarily assume that this is a negative potential. The tachometer generator 20 generates a positive voltage signal which is applied at terminal 22 to the speed controller 26. From a standing start, the voltage at 22 will of course initially be zero, gradually building up as the speed of the motor increases. The tachometer voltage is algebraically summed with the reference signal at the input of the speed controller 26. The capacitor 40 develops some charge and node 36 becomes positive; this is applied through the closed contacts 1CR1 to resistor 56 of current controller 52.

The current controller 52 algebraically sums the voltage across 54, with either the voltage across 56, or the voltage across 58. (At this point in our discussion it is the voltage across resistors 54 and 56 since contacts 2CR1 are open.) The capacitor 64 develops a charge, making node 66 negative, the negative potential on node 66 is applied to the gate pulse generator 68 which then applies a trigger signal to the single converter thyristor 16 causing conduction, and the armature 12 receives current. The armature continues to receive current as long as the thyristors are forward biased and the triggering signal is negative. The current feedback from the current sensor amplifier 72 gradually builds up as the motor adjusts to the load. The algebraic summation across resistors 54 and 56 becomes substantially equal, but because of the charge developed across capacitor 64, node 66 remains negative at equilibrium (motoring).

The field circuit will now be considered. During startup, the CEMF of the motor is relatively small, building up from zero. The weak field reference potentiometer 128 is adjusted so that it alone is sufficient to take the motor up to weak field flux. However, when the motor is started the field should be at full field. Therefore some current must be supplied, which added to the weak field current, will bring the motor to full field flux.

The potential at node 36 is reversed by the bistable amplifier 74 so that the positive potential on node 36 becomes a negative potential at node 82. (As previously indicated bistable means 74 swings between +10 and −10 v., so that node 82 is at −10 v.). The −10 v. on node 82 is inverted by inverter 84 resulting in a +10 v. on node 92. The potential on node 92, through resistor 98 supplies one input to CEMF controller 94. From standstill the CEMF is zero, gradually building up to a negative potential which is supplied through resistor 96. The CEMF controller 94 is a high-gain amplifier so that any small mismatch will saturate the amplifier. The +10 v. volt input through resistor 98 results in a −10 v. at node 106. The negative input to resistor 116 plus the negative input from the weak field potentiometer 128 causes node 124 to swing positively, and when applied to the pulse generator 126a results in a positive trigger signal which triggers the dual converter motor field exciter 18 taking the field current up to full field flux, in the positive direction. As the motor speeds up the CEMF increases so that the input to resistor 96 becomes more and more negative. The amplifier 94 is still mismatched at its inputs, and the amplifier is saturated, so that node 106 is a −10 v. As the mismatch becomes less and less, node 106 goes from −10 v. toward zero. The voltage across resistor 118 is constant. The summation of the voltages across resistor 116 and 118 becomes then less negative. The voltage feedback from field current sensor amplifier 134 develops a positive voltage across resistor 114. The algebraic summation continues, and finally reaches an equilibrium position where the voltage across resistor 114 is equal to the sum of the voltages across resistors 116 and 118. As the equilibrium position approaches, the output at node 124 becomes smaller. The smaller output applied to the gate pulse generator 126a means that the dual converter motor field exciter 18 is turned on less, so that the total field current through the field winding 14 is reduced. The process is repetitive and continues until the field current establishes itself at some magnitude, usually less than full field flux, commensurate with the motor speed selected.

DECELERATION

The motor 10 is now running with a field flux something less than full field, and the dual converter 18 is being fired by the pulse gating generator 126a, in some time sequence to provide the field current necessary to establish the field flux which is a function of the motor speed selected. The conditions at motoring are depicted in FIGS. 2(a) through 2(d) as follows.

FIG. 2(a) the voltage reference signal is at some negative value identified at 164.

FIG. 2(b) the tachometer generator voltage is at some positive value identified at 166.

FIG. 2(c) the armature current has the steady state current value identified at 168.

FIG. 2(d) the motor field flux is at the steady state value indicated at 170.

Assume now that a command from the master console is given to decelerate the motor 10. This is indicated in FIG. 2(a) by the positive going ramp at 172. The tachometer generator 20 follows the decrease in motor speed for a short time $\Delta t$ as indicated by the negative ramp at 174 in FIG. 2(b).

It will be recalled that node 36 is at some positive value by reason of the charge on capacitor 40. When the tachometer generator fails to follow the ramp reference signal, there is a mismatch at the inputs to the speed controller 26, and node 36 begins to go negative. When node 36 is negative, bistable device 74 causes output node 82 to go to +10 v. This is immediately felt as a positive input to resistor 118 of operational amplifier 112. Further, the inverter 84 inverts the +10 v. at node 82 to a −10 v. at node 92, and this causes node 106 to go positive. The inputs across resistors 114, 116 and 118 are all positive. The voltage at node 124 swings violently negative, and gating pulse generator means 126b, fires the other side of the dual converter 18 causing a reversal in the current through the field winding 14. This reversal in field current will ultimately cause the potential at resistor 114 to go negative. The operational amplifier 112 will become stabilized when the voltage across resistor 114 is equal to the voltage across resistor 116 and 118. The field current and hence the flux begins to fall off and the flux approaches +φ weak field identified at 176 in FIG. 2(d).

Keeping in mind what is happening to the field current and field flux, we shall digress slightly to consider the operation of the bistable devices 138 and 140. Both bistable devices 138, 140 receive a common input from the field current sensor amplifier 134, which they sum across their respective input resistors 144, 146; 154, 156 respectively. The bistable means are so designed that when its net input is positive, the associated relay in the output circuit will be deenergized. During motoring, input resistor 146 will receive a positive input and resistor 144 will have a negative input from the potentiometer 150, but the wiper 148 is so positioned that the net input to bistable device 138 is positive. Bistable device 140 sees a positive input since the voltage signals across both resistor 154 and resistor 156 are positive. Relays 1CR and 2CR are thus both deenergized. When the flux reaches +φ weak field FIG. 2(d); 176, the field current sensor begins to go negative (it will be recalled that the field current is being reversed), resulting in a net negative input to bistable amplifier 138. When the negative potential overcomes the positive signal, relay 1CR is energized and as a result normally closed contacts 1CR1 are opened. Note that the armature control circuit is open circuited i.e., 1CR1 and 2CR1 are open, and the armature current goes to zero as indicated at FIG. 2(c); 178.

The field current (and field flux) continues to decrease until it reaches −φ weak field FIG. 2(d); 180. The field current sensor amplifier 134, as a concomitant to the reversal in field current, has been developing an output signal at node 136 which has become increasingly negative. When the flux is at FIG. 2(d): 180, bistable means 140 sees a net negative input i.e., the negative signal across 154 is greater than the positive signal provided by potentiometer 160, and relay 2CR is now energized closing contacts 2CR1.

The negative potential at node 36, translated through contacts 2CR1 is inverted by inverter 42 to make node 50 a positive potential. The inputs to current controller 52 are: a positive potential at resistor 58 and a negative potential at resistor 54. The algebraic summation of the signals at resistors 54, 58 plus the fact that the capacitor 64 is charged negatively, causes node 66 to swing negatively and a triggering signal is applied from the gate pulse generating means 68 to the single converter 16 causing current to flow in the same direction through the armature. The ampere × time of armature current flow is identified by the crosshatched area FIG. 2(c): 182. Note that while the current through the armature 12 is in the same direction, the polarity of the armature is identified in FIG. 1 now as + and −, the physical motor now actually functionally as a generator returning current to the line.

The field current continues to flow in the reverse direction and the flux bottoms at −φ full field as indicated at 184 FIG. 2(d).

The tachometer generator voltage signal has been falling in magnitude as the speed of the motor is reduced. Finally, the tachometer voltage signal equals the ramp reference signal and then becomes smaller as indicated in the voltage vs. time curve in FIG. 2(b) at 186. With the field flux at FIG. 2(d): 188 and the tachometer generator voltage at FIG. 2(b): 186, the node 36 begins to go from negative to positive and the motor 10 starts to go back to motoring. The situation now happens in reverse.

With node 36 positive, bistable device 74 develops a −10 v. at 82, inverter 84 converts this to −10 v. at 92, and node 106 goes negative. The change in potential at node 82 is immediately felt by the weak field reference 128 which applies a negative potential to input resistor 118. The amplifier 112 now has inputs as follows: the voltage at 114 is positive because the field current cannot change instantly, while the voltage across resistors 116 and 118 is negative. The voltage at node 124 goes rapidly positive and the gate pulse generating means 126a triggers the thyratrons of the dual converter 18 sending current in the reverse direction $m_m$.

When the flux reaches −φ weak field FIG. 2(d): 190 the voltage on node 136 (the output of the field current sensor 134) is quite small in magnitude, so that bistable amplifier 140 has a net positive voltage input because of the greater magnitude of the potentiometer 160. Relay 2CR is deenergized opening contacts 2CR1. The bistable amplifier 138 still has a net negative input, so relay 1CR remains energized. Thus the armature control circuit is open i.e., contacts 1CR1 and 2CR1 are open.

The field current continues to increase causing the field flux to reach +φ weak field as identified in FIG. 2(c): 192. At this point the output of the field current sensor 134 will be sufficiently positive to overcome the negative input from the potentiometer 150 and bistable means 138 will then deenergize relay 1CR returning contacts 1CR1 to the normally closed position shown in FIG. 1.

Both relays 1CR and 2CR are deenergized and the motor 10 is now operating the motoring mode. The motor 10 is now at quiescent conditions for the speed selected.

FIG. 2(a) the command voltage signal is at 194 which is a function of the speed selected.

FIG. 2(b) the tachometer signal is at 196 which is a voltage equal to the ramp voltage signal.

FIG. 2(c) the armature current, after the transient excursion, has settled down to the steady state value at 198.

FIG. 2(d) the flux is at 200 which is some higher magnitude than 170, the increase in flux being commensurate with the reduced motor speed.

Thus it will be noted that during the period when the field flux is in the region +φ weak field to −φ weak, approaching from either direction, and identified by the crosshatching at 202 and 204, the armature current is zero which is the desired objective, in order to protect the motor. Further, regeneration has been accomplished with no reversal in the armature current, solely by the use of control circuitry—no inverting contactors of any kind are necessary. This permits a smooth, controlled regeneration period which would not be possible with inverting contacts. The same control circuitry can be utilized for reversing drives, where the machine must rotate in both directions; this makes the system economical as a result of the savings afforded by using a single converter in the armature.

It will therefore be apparent that there has been disclosed a speed regulator system for regenerative drives having wide application for industrial utilizations.

I claim as my invention:

1. A regulator system for a DC motor having means for unidirectional current transfer through the armature, and a field winding for providing the field flux φ comprising:
   a. means for monitoring to determine the generating period when said motor is regenerating, comprising first and second inputs and an output, said first input receiving a first signal which is a function of the instantaneous speed of said motor said second input receiving a signal which is a function of the speed commanded for said motor, said output having a signal of one polarity during motoring conditions and a signal of a different polarity indicative of the beginning of said generating period and occurring upon a change in said second signal indicative that the motor is accelerating;

b. means coupled to the output of said monitoring means for reversing the direction of current flow through said field winding during said generating period, and for restoring the initial direction of current flow;

c. means coupled to said field winding for determining net changes in electrical polarity and magnitude as a function of changes in field flux in the region between $+\phi$ weak and $-\phi$ weak field;

d. first relay means connected to said net change determining means and having a normally closed contact pair serially connected with said unidirectional current transfer means and e. second relay means connected to said net change determining means and having a normally open contact pair serially connected with said unidirectional current transfer means, said first and second relay means being successively energized when said flux is moving in said region in a first direction and being successively deenergized in reverse order when said flux is moving in said region in a second direction, whereby the armature is open circuited when the flux is in said region.

2. A regulator system for a DC motor for enabling both regenerative and reversible operation, said motor having means for unidirectional current transfer through the armature, and a field winding for providing the field flux $\phi$ comprising:

a. means for determining the generating period when said motor is regenerating by providing output signals of one polarity during motoring and of different polarity during deceleration;

b. means for monitoring the counter EMF (CEMF) of said motor, having dual inputs, one of which is adapted to receive signals which are a function of the instantaneous CEMF, the other of which is coupled to said determining means for receiving signals which are a function of said one polarity and of said different polarity, and an output to deliver a first monitored output signal during motoring, and a second monitored output signal upon receipt of said signal of different polarity;

c. means in said field winding for controllably permitting bilateral rectified current flow through said field winding, having input means for receiving trigger signals, the direction of current flow through said field winding being dependent upon the polarity of said trigger signals;

d. means for controlling the current through said field winding comprising first, second and third inputs and a trigger output connected to said input means, said first input being adapted to receive a first signal which is a function of the instantaneous field current, said second input being coupled to said determining means so as to respond instantly to changes in polarity of said output signals of said determining means, said third input being adapted to receive said first and second monitored output signals as a third signal respectively, the algebraic summation of said first second and third signals providing said trigger signals at said trigger output, the polarity and duration of which determine the direction and magnitude of the current through the field winding, and e. means coupled to said unidirectional current transfer means and responsive to changes in field flux $\phi$ in the region between $+\phi$ weak field and $+-$ weak field, for maintaining the armature current zero when the field flux is traversing said region from either direction.

3. A regulator system for a DC motor for enabling both regenerative and reversible operation, said motor having means for unidirectional current transfer through the armature, and a field winding for providing the field flux $\phi$ comprising:

a. means for determining the generating period when said motor is regenerating by providing output signals of one polarity during motoring and of different polarity during deceleration;

b. means for monitoring the counter EMF (CEMF) of said motor, having dual inputs, one of which is adapted to receive signals which are a function of the instantaneous CEMF, the other of which is coupled to said determining means for receiving signals which are a function of said one polarity and of said different polarity, and an output to deliver a first monitored output signal during motoring, and a second monitored output signal upon receipt of said signal of different polarity;

c. means in said field winding for controllably permitting bilateral rectified current flow through said field winding, having input means for receiving trigger signals, the direction of current flow through said field winding being dependent upon the polarity of said trigger signals;

d. means for controlling the current through said field winding comprising first, second and third inputs and a trigger output connected to said input means, said first input being adapted to receive a first signal which is a function of the instantaneous field current, said second input being coupled to said determining means so as to respond instantly to changes in polarity of said output signals of said determining means said third input being adapted to receive said first and second monitored output signals as a third signal respectively, the algebraic summation of said first, second and third signals providing said trigger signals at said trigger output, the polarity and duration of which determine the direction and magnitude of the current through the field winding, e. means coupled to said field winding for determining net changes in electrical polarity and magnitude as a function of changes in field flux in the region between $+\phi$ weak field and $-\phi$ weak field;

f. first relay means connected to said net change determining means and having a normally closed contact pair serially connected with said unidirectional current transfer means and g. second relay means connected to said net change determining means and having a normally open contact pair serially connected with said unidirectional current transfer means, said first and second relay means being successively energized when said flux is moving in said region in a first direction and being successively deenergized in reverse order when said flux is moving in said region in a second direction, whereby the armature is open circuited when the flux $\phi$ is in said region.

4. The regulator system for a DC motor having means for unidirectional current transfer through the armature, and a field winding for providing the field flux $\phi$ comprising:

a. means for monitoring the motor speed to determine the generating period when said motor is acting as a generator comprising first and second inputs and an output, said first input receiving a first signal which is a function of the instantaneous speed of said motor, said second input receiving a signal which is a function of the speed commanded for said motor, said output having a signal of one polarity during motoring conditions and a signal of a different polarity indicative of the beginning of said generating period and occurring upon a change in said second signal when the motor is decelerating;

b. means for monitoring the counter EMF (CEMF) of said motor, having dual inputs, one of which is adapted to receive signals which are a function of the instantaneous CEMF, the other of which is coupled to said speed-monitoring means, for receiving signals which are a function of said one polarity and of said different polarity, and to deliver a first monitored output signal during motoring, and a second monitored output signal upon receipt of said signal of different polarity;

c. means in said field winding for controllably permitting bilateral rectified current flow through said field winding, having input means for receiving trigger signals, the direction of current flow through said field winding being dependent upon the polarity of said trigger signals;

d. means for controlling the current through said field winding comprising third, fourth and fifth inputs and a trigger output connected to said input means, said third input being adapted to receive a third signal which is a function of the instantaneous field current, said fourth input being coupled to said motor speed monitoring means so as to respond instantly to changes in polarity of said output signals of said motor speed monitoring means, said fifth input being adapted to receive said first and second monitored output signals as a fifth signal respectively, the algebraic summation of said third, fourth and fifth signals providing said trigger signals at said trigger output, the polarity and duration of which determine the direction and magnitude of the current through the field winding, and e. means coupled to said unidirectional current transfer means and responsive to changes in field flux $\phi$ in the region between $+\phi$ weak field and $-\phi$ weak field, for maintaining the armature current zero when the field flux is traversing said region from either direction.

5. A regulator system for a DC motor having means for unidirectional current transfer through the armature, and a field winding for providing the field flux $\phi$ comprising:

a. means for monitoring the motor speed to determine the generating period when said motor is acting as a generator comprising first and second inputs and an output, said first input receiving a first signal which is a function of the instantaneous speed of the said motor, said second input receiving a signal which is a function of the speed commanded for said motor, said output having a signal of one polarity during motoring conditions and a signal of a different polarity indicative of the beginning of said transient period and occurring upon a change in said second signal the motor is decelerating;

b. means for monitoring the counter EMF (CEMF) of said motor, having dual inputs, one of which is adapted to receive signals which are a function of the instantaneous CEMF, the other of which is coupled to said speed monitoring means for receiving signals which are a function of said one polarity and of said different polarity, and an output to deliver a first monitored output signal during motoring, and a second monitored output signal upon receipt of said signal of different polarity;

c. means in said field winding for controllably permitting bilateral rectified current flow through said field winding, having input means for receiving trigger signals, the direction of current flow through said field winding being dependent upon the polarity of said trigger signals;

d. means for controlling the current through said field winding comprising third, fourth and fifth inputs and a trigger output connected to said input means, said third input being adapted to receive a third signal which is a function of the instantaneous field current said fourth input being coupled to said main speed-monitoring means so as to respond instantly to changes in polarity of said output signals of said motor speed monitoring means, said fifth input being adapted to receive said first and second monitored output signals as a fifth signal respectively, the algebraic summation of said third, fourth and fifth signals providing trigger signals at said trigger output, the polarity and duration of which determine the direction and magnitude of the current through the field winding;

e. means coupled to said field winding for determining net changes in electrical polarity and magnitude as a function of changes in field flux in the region between $+\phi$ weak field and $-\phi$ weak field;

f. first relay means connected to said net change determining means and having a normally closed contact pair serially connected with said unidirectional current transfer means; and g. second relay means connected to said net change determining means and having a normally open contact pair serially connected with said unidirectional current transfer means, said first and second relay means being successively energized when said flux is moving in said region in a first direction, and being successively deenergized in reverse order when said flux is moving in said region in a second direction, whereby the armature is open circuited when the flux $\phi$ is in said region.

* * * * *